US007027674B2

(12) United States Patent
Matsushima et al.

(10) Patent No.: US 7,027,674 B2
(45) Date of Patent: Apr. 11, 2006

(54) OPTICAL MODULE AND OPTICAL TRANSMISSION APPARATUS

(75) Inventors: Naoki Matsushima, Yokohama (JP);
Kazumi Kawamoto, Yokohama (JP);
Hideyuki Kuwano, Yokohama (JP);
Yoshiaki Niwa, Yokohama (JP);
Tetsuya Katou, Yokohama (JP)

(73) Assignee: OpNext Japan, Inc., Yokohama (JP)

( * ) Notice: Subject to any disclaimer, the term of this patent is extended or adjusted under 35 U.S.C. 154(b) by 0 days.

(21) Appl. No.: 10/611,289

(22) Filed: Jun. 30, 2003

(65) Prior Publication Data
US 2004/0264835 A1    Dec. 30, 2004

(30) Foreign Application Priority Data
Aug. 29, 2002    (JP)    .............. 2002-250693

(51) Int. Cl.
*G02B 6/12*    (2006.01)
*G02B 6/10*    (2006.01)
(52) U.S. Cl. ......................... 385/14; 385/129
(58) Field of Classification Search ................ 385/14, 385/129
See application file for complete search history.

(56) References Cited
U.S. PATENT DOCUMENTS

| 6,758,607 B1* | 7/2004 | Nakabayashi et al. ........ 385/88 |
| 6,791,439 B1* | 9/2004 | Kitamura et al. ........... 333/247 |
| 6,856,709 B1* | 2/2005 | Uesaka et al. ................. 385/2 |
| 2003/0202800 A1* | 10/2003 | Matsushima et al. ....... 398/200 |

FOREIGN PATENT DOCUMENTS
JP    2001-257412    9/2001

\* cited by examiner

*Primary Examiner*—Michelle Connelly-Cushwa
*Assistant Examiner*—Tina M Wong
(74) *Attorney, Agent, or Firm*—Townsend and Townsend and Crew LLP

(57) ABSTRACT

The present invention provides an optical module, and an optical transmission line comprising the optical module. The optical module has a structure in which an optical-modulator-mounted carrier is formed of a semiconductor substrate; a transmission line on the carrier is formed of a coplanar waveguide; a transmission line for inputting a signal into the transmission line is formed on a dielectric substrate; the transmission line on the input side which is a grounded coplanar waveguide is coupled by a conversion line to the transmission line on the output side which is a coplanar waveguide; and an electrical connection between the transmission lines is made by use of a conductor wire.

17 Claims, 6 Drawing Sheets

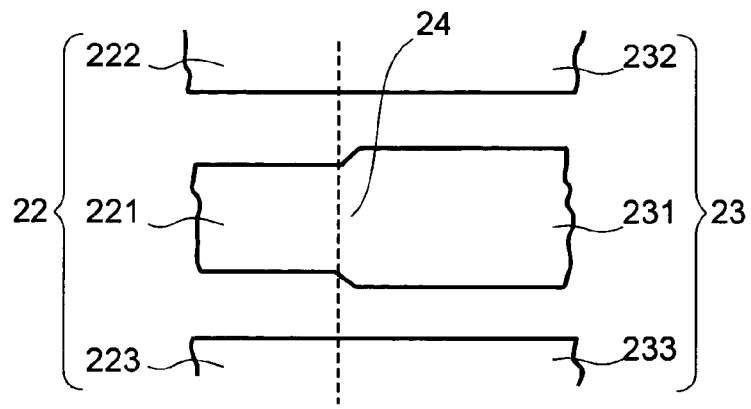
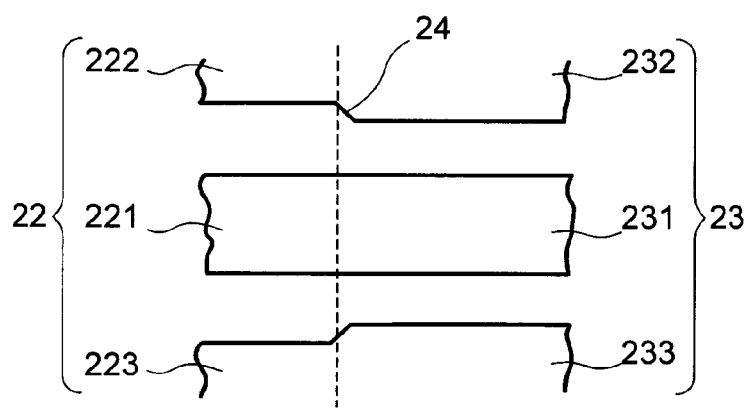
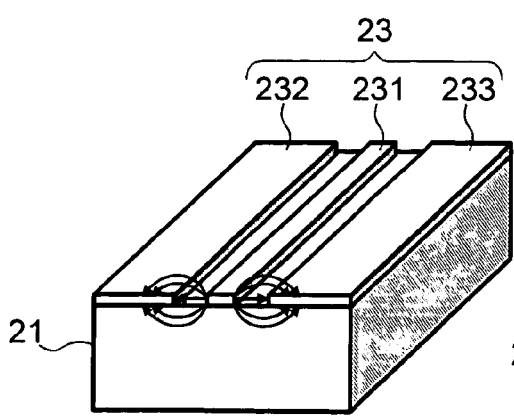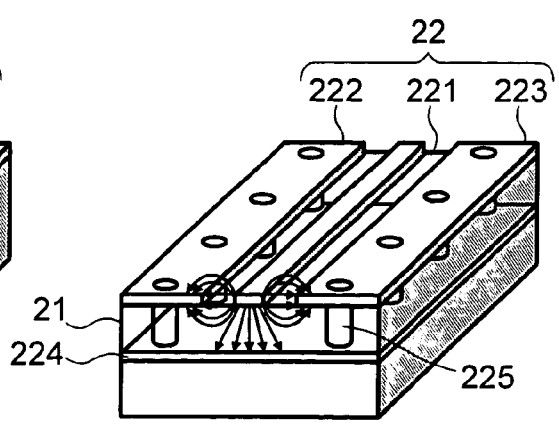

OPTICAL MODULE AND OPTICAL TRANSMISSION APPARATUS

BACKGROUND OF THE INVENTION

The present invention relates to an optical module that uses an optical element carrier formed of a semiconductor material, and that has a high-frequency transmission line capable of achieving an excellent high frequency property, and also relates to an optical transmission apparatus comprising the optical module.

In the field of optical communications, data tends to be transmitted/received at a higher bit rate year by year with the advancement of computerization. Laser modules for transmitting a light signal using an optical modulator also compulsorily require that a high frequency property of a high-frequency transmission line which transmits an electric signal to an optical modulator is improved so as to transfer a high-bit-rate light signal from the sending side to the receiving side without an error. For example, broadening of a frequency band is tried by applying the structure as shown in Japanese Patent Laid-Open No. 2001-257412 (the prior art 1).

To be more specific, the prior art 1 describes a high-bit-rate optical module that uses, as a chip carrier on which a semiconductor laser is mounted, a dielectric substrate made of alumina, aluminum nitride, or the like where a via hole used to make an electrical connection between wiring conductor layers in the substrate can be easily provided.

SUMMARY OF THE INVENTION

However, the high-bit-rate optical module requires that a laser beam optically modulated and emitted by, for example, a semiconductor laser integrated with an optical modulator is condensed by a condenser lens and is then entered into an optical fiber. Therefore, for example, it is necessary to form a V-groove, the size and shape of which are highly accurate so as to position the condenser lens with a high degree of accuracy, in front of the semiconductor laser mounted on the chip carrier. If a highly accurate V-groove can be formed, placing a condenser lens having a high degree of accuracy in outside dimension in the V-groove makes it possible to mount a lens by a simple and easy assembling process that does not require active alignment. As a result, it is possible to reduce a price of the high-bit-rate optical module. However, it is difficult to efficiently form a highly accurate V-groove on the dielectric substrate as described in the prior art 1.

On the other hand, as a chip carrier for which a V-groove having a high degree of accuracy in dimension can be easily formed by anisotropic etching, there is a semiconductor substrate made of Si, etc. However, in the case of the semiconductor substrate made of Si, etc., it is not easy to bore a through hole used for an electrical connection between wiring conductor layers in the substrate and to embed a via hole in this through hole for the electrical connection. Therefore, in the case of the semiconductor substrate made of Si, etc., it becomes difficult to establish an electrical connection between the wiring conductor layers. As a result, resonance arises in the high-frequency transmission line formed on the substrate surface in a high frequency band. Accordingly, there is a high possibility that the semiconductor substrate cannot be applied to a high-bit-rate optical module.

The present invention has been made to solve the problem, and an object of the present invention is to provide an optical module having a high-frequency transmission line, which is provided with an excellent high frequency property and can be manufactured at low cost, and an optical transmission apparatus comprising the optical module, for the purpose of solving the problem.

According to one aspect of the present invention, there is provided an optical module comprising: a carrier on which an optical element is mounted, said carrier being formed of a semiconductor material where a first high-frequency transmission line for transmitting a high-frequency electric signal to the optical element is formed; and a dielectric substrate where a second high-frequency transmission line for supplying a high-frequency electric signal to the first high-frequency transmission line of the carrier is formed; wherein: an electrical connection is made between the first high-frequency transmission line and the second high-frequency transmission line by use of a conductor wire, or a conductor wire and a third high-frequency transmission line; said first high-frequency transmission line is formed of a coplanar waveguide; and said second high-frequency transmission line is formed by coupling a first coplanar waveguide, which is formed on the input side by providing a ground layer under the transmission line across a dielectric, to a second coplanar waveguide formed on the output side with a distance between a signal wiring conductor of the transmission line and the ground layer made longer as compared with the first coplanar waveguide or formed on the output side without providing the ground layer.

In addition, according to the present invention, said optical module is characterized in that the carrier and the dielectric substrate are placed on and secured to a base member.

In addition, according to the present invention, said optical module is characterized in that in the first coplanar waveguide of the second high-frequency transmission line, an electrical connection is made between the ground layer under the transmission line and the ground wiring conductor of the transmission line by use of a via hole.

According to another aspect of the present invention, there is provided an optical module comprising: a carrier on which an optical element is mounted, said carrier being formed of a semiconductor material where a fourth high-frequency transmission line for transmitting a high-frequency electric signal to the optical element is formed; and a dielectric substrate where a fifth high-frequency transmission line for supplying a high-frequency electric signal to the fourth high-frequency transmission line of the carrier is formed; wherein: an electrical connection is made between the fourth high-frequency transmission line and the fifth high-frequency transmission line by use of a conductor wire; said fourth high-frequency transmission line is formed of a coplanar strip waveguide; and said fifth high-frequency transmission line is made up of the coplanar waveguide formed on the input side, the coplanar strip waveguide formed on the output side, and a conversion transmission line used for connecting the waveguides.

In addition, according to the present invention, said optical module is characterized in that ground wiring in the coplanar strip waveguide of the fourth high-frequency transmission line is formed by using a conductor wire to make an electrical connection to a metal part in a base member (a member on the under surface of the carrier) to which the carrier is secured.

According to another aspect of the present invention, there is provided an optical module wherein: a carrier on which an optical element is mounted is secured to a base member, said carrier being formed of a semiconductor material where a fourth high-frequency transmission line for transmitting a high-frequency electric signal to the optical element is formed, said fourth high-frequency transmission line being formed of a coplanar strip waveguide; and ground wiring in the coplanar strip waveguide is electrically connected to a metal part in the base member by use of a conductor wire.

According to another aspect of the present invention, there is provided an optical module, said optical module comprising: a first substrate on which an optical element is mounted, said first substrate being formed of a semiconductor substrate where a first high-frequency transmission line for transmitting a high-frequency electric signal to the optical element is formed; and a second substrate formed of a dielectric substrate where a second high-frequency transmission line for supplying a high-frequency electric signal to the first high-frequency transmission line of the first substrate is formed, wherein: said first high-frequency transmission line is formed of a surface coplanar waveguide; and said second high-frequency transmission line is formed by coupling a grounded coplanar waveguide formed on the input side to the surface coplanar waveguide formed on the output side.

According to another aspect of the present invention, there is provided an optical transmission apparatus comprising: said optical module and a multiplexing IC that multiplexes an inputted parallel signal and then inputs the multiplexed signal into the optical element of the optical module.

BRIEF DESCRIPTION OF THE DRAWINGS

FIG. 3A is a plan view, and FIG. 3B is a cross section along a line A–A' shown in the plan view;

FIGS. 4A and 4B are enlarged views illustrating a conversion line of a transmission line on a dielectric substrate shown in FIGS. 3A and 3B;

FIGS. 5A and 5B are diagrams illustrating the electric field distribution in a surface coplanar waveguide and a grounded coplanar waveguide shown in FIGS. 3A and 3B;

FIG. 7A is a plan view, and FIG. 7B is a cross section along a line B–B' shown in the plan view.

DETAILED DESCRIPTION OF THE PREFERRED EMBODIMENT

Embodiments of a high-frequency circuit, and an optical module and an optical transmission apparatus, which use the high-frequency circuit, according to the present invention will be described with reference to diagrams.

Figure 1:
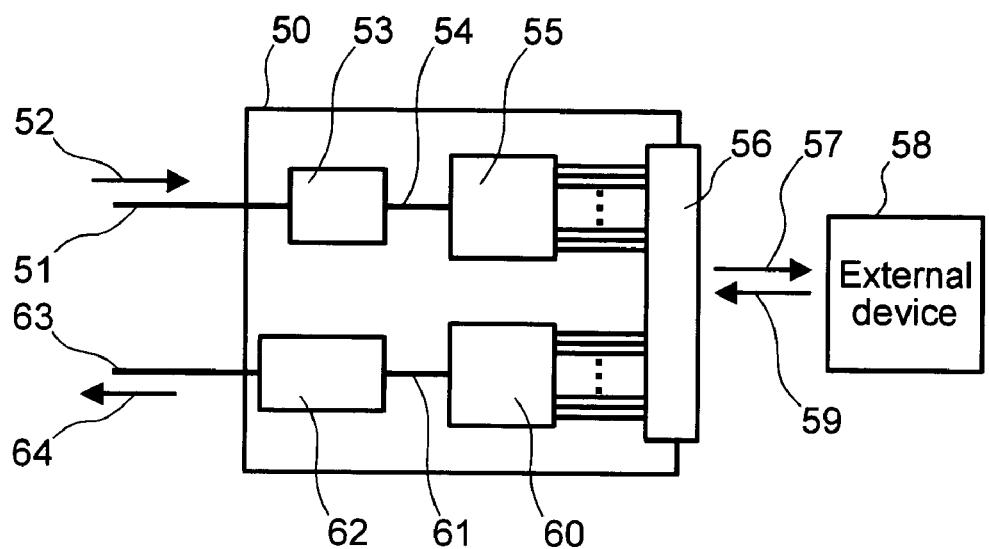
FIG. 1 is a schematic diagram illustrating a configuration of an optical transmission apparatus according to the present invention.

The optical transmission apparatus is configured as shown in FIG. 1. To be more specific, the optical transmission apparatus 50 comprises an optical transceiver having an optical module (LD module) 62 for transmitting an optical output signal 64 through an optical fiber 63, and an optical module (PD module) 53 for receiving an optical input signal 52 through an optical fiber 51. A parallel signal 59 of about 1 Gbit/s is inputted into a multipin connector 56 from an external device 58. Then, the inputted signal is multiplexed and converted into a signal of about 10 Gbit/s by a multiplexing IC 60. After that, the signal of about 10 Gbit/s is transmitted through a transmission line 61 to a LD module 62 where the signal is converted into an optical output signal 64 before it is output. On the other hand, the optical input signal 52 is inputted into the receiver module 53, which converts the signal into a signal of about 10 Gbit/s. The converted signal is then transmitted through a transmission line 54 to a demultiplexer IC 55 where the signal is demultiplexed into a signal of about 1 Gbit/s, which is then output as a parallel signal 57 from the multipin connector 56 to the external device 58.

Figure 2:
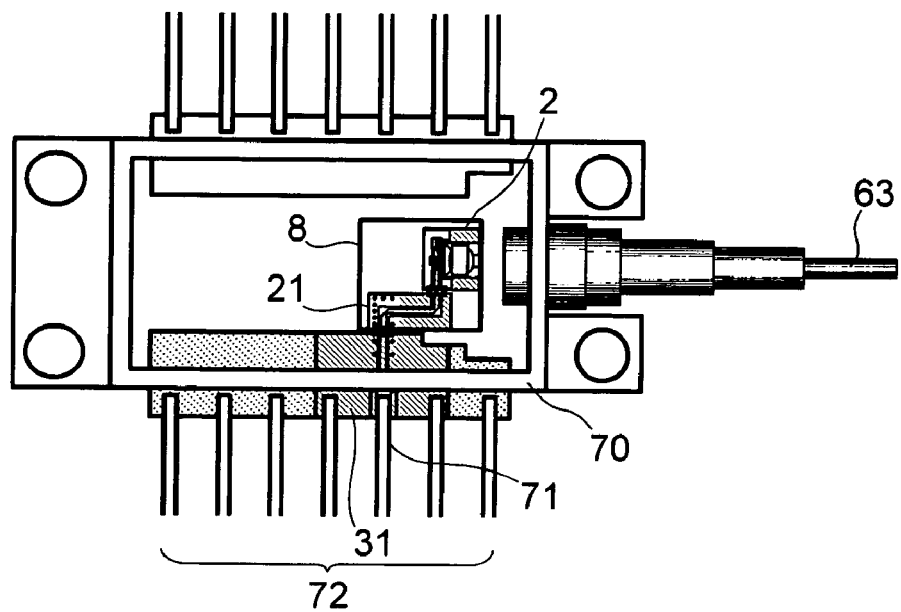
FIG. 2 is a schematic diagram illustrating one embodiment of an optical module (LD module) according to the present invention.

Next, the transmission module 62 according to the present invention will be specifically described with reference to FIG. 2. The transmission module 62 comprises: lead wires 72 including a signal input line 71 into which an electric signal from the multiplexing IC 60 is inputted; a package substrate 31 formed of a dielectric substrate having a package transmission line 30 to which the signal input line 71 is connected; a base member 8, a surface of which is formed of metal, on which a dielectric substrate 21 (having a transmission line 20 connected to the package transmission line 30 by an Au wire 32') and an optical-modulator-mounted carrier (optical-modulator-mounted substrate) 2 are mounted; and a module package case 70 equipped with an optical fiber 63 having an isolator. As a material for the base member 8, a metallic material is used, and a ceramic and a peltier cooler, at least a surface of which is formed of metal, can also be used. The base member 8 is secured to the bottom of the module package case 70 with solder.

Next, an embodiment of an optical module (LD module) handling a high bit rate (about 10 Gbit/s or more) according to the present invention will be described with reference to FIGS. 3 through 8.

To begin with, a first embodiment of an optical module handling a high bit rate according to the present invention will be described with reference to FIGS. 3 through 6.

Figure 3A:
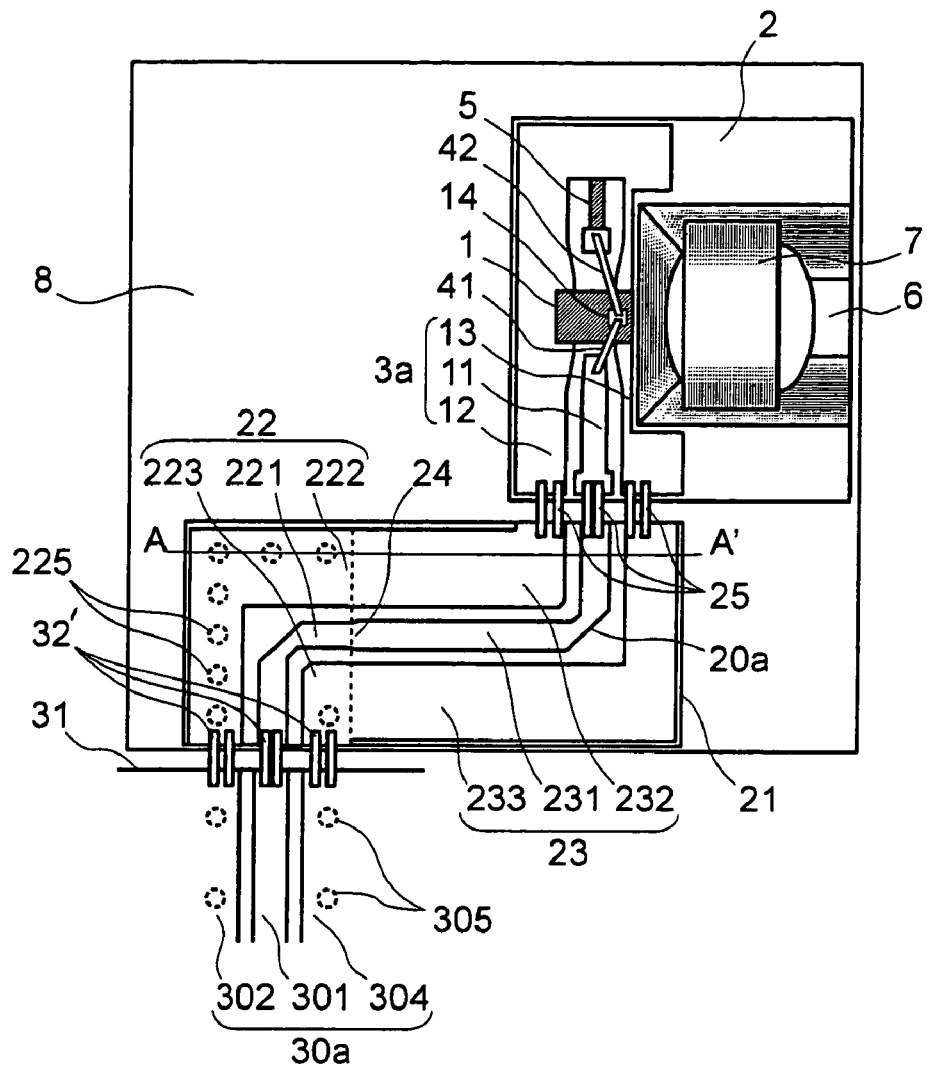
FIGS. 3A and 3B are schematic diagrams illustrating a first embodiment of a high-frequency transmission line according to the present invention; more specifically.
Figure 3B:
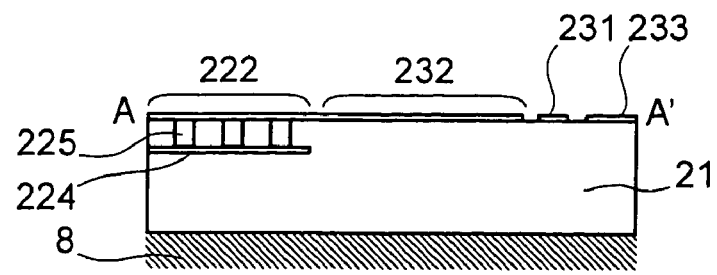

FIGS. 3A and 3B relate to a high-frequency transmission line for a high-frequency signal of about 10 Gbit/s or more according to the present invention, and illustrate a transmission line on a carrier where an optical modulator is mounted, and a transmission line for supplying a signal to the optical modulator, and areas around the transmission lines. In this embodiment, a semiconductor laser integrated with an optical modulator is used as an optical modulator 1 that is an optical element. As the carrier (substrate) 2 on which the optical modulator 1 is mounted, a semiconductor substrate, a main constituent of which is one of Si, GaAs, and InP, is used so that working such as etching becomes easy when manufacturing a semiconductor. This carrier 2 is secured to the base member 8 with solder or an adhesive. A transmission line (first high-frequency transmission line) 3a is formed on a surface of the semiconductor substrate 2 made of Si, etc. in a manner that on the surface, ground wiring conductors 12, 13 are placed on both sides of a signal wiring conductor 11 to form a coplanar waveguide (surface coplanar waveguide). Au, etc. are used as a material of this transmission line 3a. The optical modulator 1 is secured with solder or the like at a place ahead of the transmission line 3 on the surface of the substrate surface. The transmission line 3a and an electrode 14 of the optical modulator 1 are electrically connected using a conductor wire 41 made of Au, etc. In addition, in an area opposite to where there is the transmission line 3a of the optical modulator 1, a terminating resistor 5 is formed. A conductor wire 42 made of Au, etc. is provided also between the terminating resistor 5 and the electrode 14 of the optical modulator 1 to establish an electrical connection. A configuration shown in FIG. 3 of Japanese Patent Laid-Open No. 2001-257412 can be applied to a circuit configuration of how to connect the optical modulator 1, the signal wiring conductor 11 into which a signal is inputted, and the terminating resistor 5, one end of which is connected to the ground wiring conductors 12, 13.

Moreover, on a surface of the semiconductor substrate 2 made of Si, etc., but on the front part in an optical-axis direction of the optical modulator 1, a V-groove 6 made by the anisotropic etching is formed. It is so devised that mounting, for example, a condenser lens 7 to this V-groove 6 causes a beam from the optical modulator 1 to condense at an incident end of the optical fiber 63. To be more specific, using the semiconductor substrate 2 as a substrate on which the optical modulator 1 is mounted makes it possible to form the high-accuracy V-groove 6 by the anisotropic etching that is one of processing techniques for manufacturing a semiconductor. As a result, if a condenser lens 7 having a high degree of accuracy in outside dimension is placed in the V-groove 6, it becomes possible to mount a lens by a simple and easy assembling process that does not require active alignment, and accordingly it is possible to reduce a price of a high-bit-rate optical module.

It is to be noted that if a carrier is configured using a semiconductor substrate, not only the condenser lens 7 but also an optical fiber, an optical component, the optical modulator 1, and the like, which constitute the optical module, can be positioned and placed with a high degree of accuracy, for example, in the V-groove 6 which is easy to be formed with high-accuracy.

In this manner, the optical modulator 1, the condenser lens 7, and the like, are mounted on the semiconductor substrate 2. Therefore, the transmission line (second high-frequency transmission line) 20a which supplies a signal to the transmission line 3a on the optical-modulator-mounted carrier 2 is formed of the dielectric substrate 21 because the transmission line 20a requires a grounded coplanar waveguide judging from the relation with the package substrate 31 that is a dielectric substrate. A dielectric substrate such as alumina and aluminum nitride is used as this dielectric substrate 21, and is secured to the base member 8 with solder or an adhesive. As line configurations 22, 23, the transmission line (third high-frequency transmission line) 30a formed in the package substrate 31 on the input side is a grounded coplanar waveguide, and the transmission line 3a formed in the semiconductor substrate 2 on the output side is a surface coplanar waveguide. Therefore, a structure in which coupling is made by a conversion line 24 is provided as shown in FIGS. 4A and 4B to make a difference between the input side and the output side, and to achieve characteristic impedance matching between the line configurations 22, 23.

FIG. 3B is a cross section along a line A–A' in the dielectric substrate 21. On the input side, a coplanar waveguide 22 constituted of the signal wiring conductor 221 and the ground wiring conductors 222, 223 is formed on a surface of a substrate. For the substrate as a multilayer structure, a ground wiring layer 224 is provided in the middle layer of the substrate. Then, the ground wiring layer 224 is electrically connected to the ground wiring conductors 222, 223 on the surface by use of via holes 225, and thereby the grounded coplanar waveguide (first coplanar waveguide) is formed. It is to be noted that as for the grounded coplanar waveguide 22, it is not always necessary to connect the ground wiring layer 224 to the ground wiring conductors 222, 223 on the surface by use of the via holes 225. However, it is desirable to connect them using the via holes 225.

On the other hand, on the output side, the surface coplanar waveguide (second coplanar waveguide) 23 constituted of the signal wiring conductor 231 and the ground wiring conductors 232, 233 is formed on the surface of the substrate. However, there is no ground conductor layer in the middle of the substrate, and there is no via hole having an electrical connection to the surface ground wiring conductor. To be more specific, as for the surface coplanar waveguide (second coplanar waveguide) 23, a distance between the signal wiring conductor 231 of a transmission line and a ground layer is longer so that the ground layer doses not affect the electric field distribution formed by the output side transmission line 23, as compared with the grounded coplanar waveguide 22; or the coplanar waveguide 23 is configured to have no ground layer excepting a surface which the dielectric substrate 21 is mounted on the base member 8, the case 70 or a stem (not shown) etc.

In this manner, the dielectric substrate 21 is placed on the base member 8, at least a surface of which is formed of metal. Accordingly, as for the output side transmission line (second coplanar waveguide) 23, the base surface is associated with a lower-layer ground surface. Nevertheless, as compared with the input side transmission line 22, a distance (a thickness of the dielectric) between the surface and the lower-layer ground layer becomes thicker. Accordingly, as compared with the electric field distribution formed by the input side transmission line (first coplanar waveguide) 22 shown in FIG. 5B, the electric field distribution formed by the output side transmission line 23 shown in FIG. 5A includes more electric fields generated between the signal cable 231 and the ground wiring conductor 232 on the surface layer and between the signal cable 231 and the ground wiring conductor 233 on the surface layer. Because the input side transmission line 22 has the ground wiring layer 224 as the middle layer of the substrate, electric lines of force from the signal cable 221 to the ground wiring layer 224 and electric lines of force from the signal cable 221 to the ground wiring conductors 222, 223 form the electric field distribution.

Each of the two transmission lines 22, 23 having configurations different from each other is devised to have a size that makes its characteristic impedance the same as the other, that is, about 50 Ω. However, as shown in FIGS. 4A and 4B, the conversion line 24 connecting these lines is devised to have a structure in which a line size gradually changes so as not to increase a loss due to a sudden change in transmission mode. In the input side transmission line 22, there is the ground wiring layer 224 in the middle layer of the substrate, whereas in the output side transmission line 23, there is no ground wiring layer in the middle layer of the substrate. Therefore, in order to prevent a transmission mode from suddenly changing in the conversion line 24 connecting these lines, in FIG. 4A, a structure in which a width of the signal wiring conductor is gradually increased from the input side toward the output side is provided, and in FIG. 4B, a structure in which a clearance is gradually decreased from the input side toward the output side between the ground wiring conductors is provided. It is to be noted that in FIGS. 4A and 4B, chain lines indicate a position of an edge of the ground wiring layer 224 in the transmission line 22 on the input side. In this manner, providing the conversion line 24 between the input side transmission line 22 and the output side transmission line 23 causes the electric field distribution to change smoothly, making it possible to change a transmission mode of an input signal into a coplanar mode with low loss.

In this embodiment, a transmission line 20a on the dielectric substrate 21 has a structure comprising two bent parts. This is because of the positional relation between the signal input section to the dielectric substrate 21 and the optical modulator 1. Hence, depending on a position of the signal input section, the number of bent parts existing in the transmission line 20a on the dielectric substrate 21 may be other than two, or the transmission line 20a may be formed of a straight-line line having no bent part.

The output side transmission line 23 of the dielectric substrate 21 is electrically connected to the transmission line 3a of the optical-modulator-mounted carrier 2 through the conductor wire 25 made of Au, etc. In addition, the input side transmission line 22 is electrically connected to the transmission line 30a formed in the package substrate 31 of the optical module through the conductor wire 32' made of Au, etc.

As is the case with the input side transmission line 22 of the substrate, the package transmission line 30a is a grounded coplanar waveguide having a structure as follows: ground wiring conductors 302, 303 are placed on both sides of a signal wiring conductor 301; a ground layer exists in a lower layer; and the ground layer and the ground wiring conductors 302, 303 are electrically connected by use of via holes 305. A signal line and a ground line of the input side transmission line 22 of the dielectric substrate 21 and those of the transmission line 30a of the package substrate 31 are connected through the conductor wires 32' made of Au, etc. A high-frequency electric signal is inputted from this package transmission line 30a, and then passes through the transmission line 20a on the dielectric substrate 21 and the transmission line 3a on the optical-modulator-mounted carrier 2 before the signal is inputted into the optical modulator 1.

On the assumption that a signal for a grounded coplanar mode is directly inputted from the dielectric substrate 21 into the transmission line 3a for a surface coplanar mode on the carrier 2, an electric field leaks out to the semiconductor substrate 2 at a specific frequency, in particular, at a high-frequency (>5 GHz), which causes resonance, resulting in a deterioration in transmission characteristic.

However, with the shape as described above, a transmission mode in the transmission line 30a on the package substrate 31 and in the input side transmission line 22 on dielectric substrate 21 becomes the grounded coplanar mode. Then, the transmission mode changes in the conversion line 24. In the output side transmission line 23, the transmission mode becomes the surface coplanar mode. Accordingly, it becomes possible to switch a transmission mode of an electric signal, which is inputted into the transmission line 3 formed in the semiconductor substrate 2, to the surface coplanar mode. As a result, the resonance is avoided, and thereby a wide frequency band of the transmission line is made available, making it possible to achieve a high bit rate of about 10 Gbit/s or more.

On the other hand, as for the surface coplanar waveguide, a potential difference may arise in the ground wiring conductors on both sides at a specific frequency, which hinders transmission in the coplanar mode, resulting in a deterioration in transmission characteristic. As a method for preventing this, there is a means for changing a transmission mode (grounded coplanar mode) of an input signal to the surface coplanar mode or the surface coplanar mode with low loss at least without making a length of the surface coplanar waveguide 23 on the dielectric substrate 21 too long. The present invention uses the means, and accordingly provides a structure in which a grounded coplanar waveguide is used as the input side transmission line 22 of the dielectric substrate 21, both the right and left ground wiring conductors 222, 223 are always kept at the same potential using the lower-layer ground layer 224 and the via hole 225, and the transmission mode conversion line 24 is provided to permit the transmission mode to be smoothly changed from the grounded coplanar mode to the surface coplanar mode. As a result, an excellent property can be achieved regardless of the transmission mode of the input signal.

Figure 6:
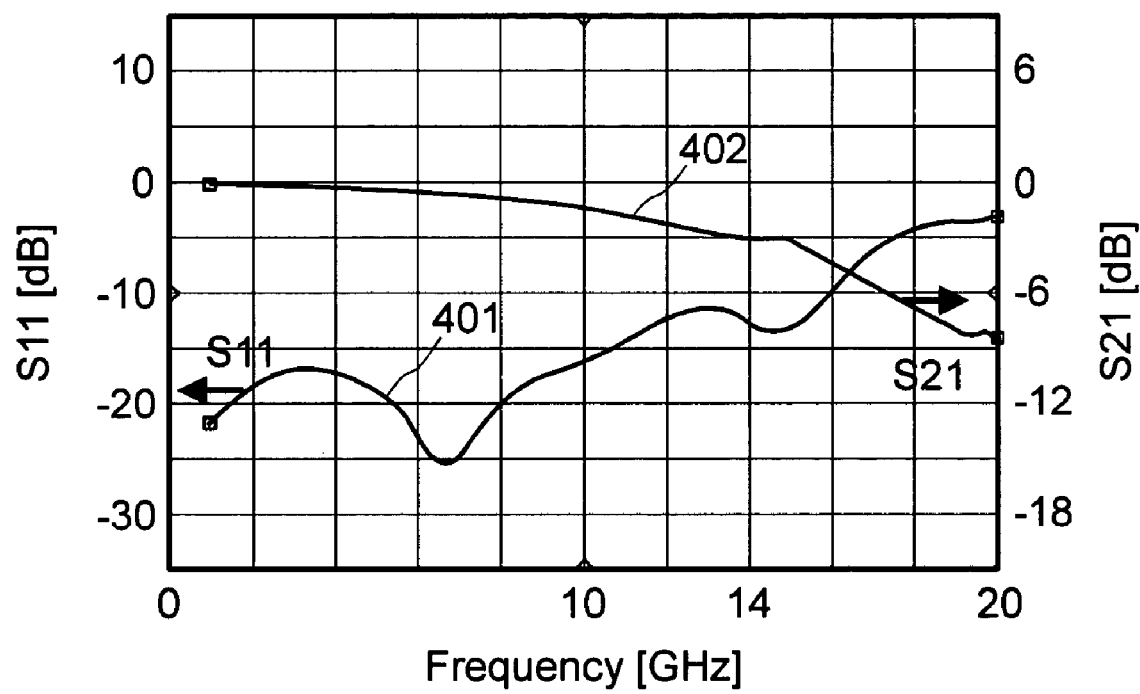
FIG. 6 is a graph illustrating transmission characteristics of an optical module with a high-frequency transmission line according to the present invention.

FIG. 6 is a graph illustrating the simulation result of transmission characteristics of an optical module that uses a high-frequency transmission line according to the present invention shown in FIGS. 3A and 3B. In the figure, a curve 401 represents a reflection property S11, and a curve 402 represents a passing property (S21). A reflection loss. (S11) at 10 GHz is −16 dB, which is not more than −10 dB. A band, an insertion loss (S21) of which is less than −3 dB, corresponds to 0 through 14 GHz. Thus, it is understood that a value of about 10 Gbit/s which is excellent for an optical module is obtained.

As described above, according to the first embodiment, it is possible to realize an optical module equipped with a high-frequency transmission line having an excellent high-frequency transmission characteristic of about 10 Gbit/s or more at low cost by making a length of the coplanar waveguide 23 on the output side of the dielectric substrate 21, which is connected to the surface coplanar waveguide 3a formed on the semiconductor substrate 2 by use of the conductor wire 25 made of Au, etc., relatively short to make a smooth connection from the grounded coplanar waveguide 22 on the input side to the surface coplanar waveguide 23 on the dielectric substrate 21.

Figure 7A:
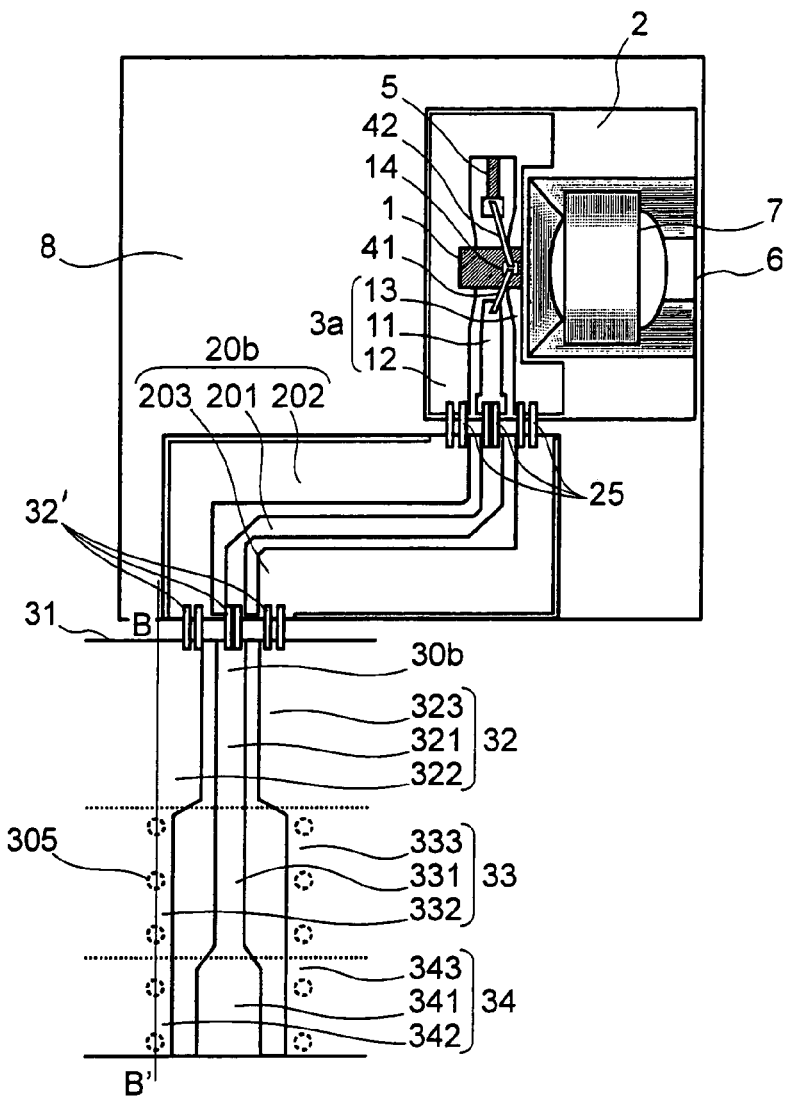
FIGS. 7A and 7B are schematic diagrams illustrating a second embodiment of a high-frequency transmission line according to the present invention; more specifically.
Figure 7B:
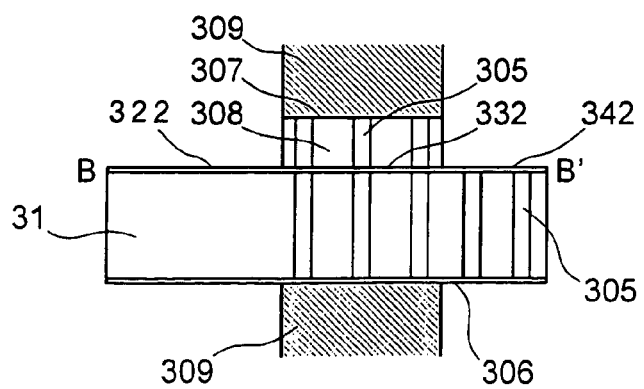

Next, a second embodiment of an optical module handling a high bit rate according to the present invention will be described with reference to FIGS. 7A and 7B As is the case with FIGS. 3A and 3B, FIGS. 7A and 7B relate to a high-frequency transmission line according to the present invention, and are diagrams illustrating a transmission line on a carrier where an optical modulator is mounted, and areas around another transmission line for supplying a signal to the optical modulator. Points of difference between the first embodiment and the second embodiment are that a part which changes a transmission mode from the grounded coplanar mode to the surface coplanar mode is formed in a transmission line 30b of the optical module package substrate 31, and that a surface coplanar waveguide is applied to a transmission line 20b on the dielectric substrate 21. The transmission line 20b has a signal wiring conductor 201 and ground wiring conductors 202, 203. It is to be noted that the transmission line 3a on the carrier 2 where the optical modulator 1 is mounted, and optical parts, are configured in the same manner as those shown in FIGS. 3A and 3B. Therefore, the dielectric substrate 21 does not have via holes and a middle metal layer formed inside; the dielectric substrate 21 is constituted of a single layer dielectric. On the other hand, as for the transmission line 30b of the package substrate 31 formed of a dielectric substrate, as shown in a B–B' cross section of FIG. 7B, the input side transmission lines 33, 34 are provided with a lower metal layer 306 and a via hole 305 to form a grounded coplanar waveguide (first coplanar waveguide), and the output side transmission line 32 (the side to be connected to the dielectric substrate 21) has no via hole inside the substrate and no metal layer (ground layer) on the under surface of the substrate so as to form a surface coplanar waveguide (second coplanar waveguide). To be more specific, as for the surface coplanar waveguide (second coplanar waveguide) 32, a distance between a signal wiring conductor 321 of a transmission line and a ground layer is longer so that the ground layer doses not affect the electric field distribution formed by the surface coplanar waveguide 32, as compared with the grounded coplanar waveguides 33, 34; or the surface coplanar waveguide 32 is configured to have no ground layer excepting a surface which the package substrate 31 is mounted on a wall 309 of the case, the base member 8, the case 70 or a stem (not shown) etc. The input side transmission line 34 has a signal wiring conductor 341 and ground wiring conductors 342, 343. The input side transmission line 33 has a signal wiring conductor 331 and ground wiring conductors 332, 333. The output side transmission line 32 has a signal wiring conductor 321 and ground wiring conductors 322, 323.

It is to be noted that because the wall 309 of a case 70 of the optical module package exists above and below the transmission line 33, a dielectric 308 exists also on the upper part of the transmission line to prevent the wall 309 and a signal line 331 of the transmission line from being short-circuited. The via holes 305 are formed also inside this dielectric 308, and left and right ground wiring conductors 332, 333 are electrically connected through the via holes 305 and a metal layer 307.

Also in the second embodiment, the transmission line 20b on the dielectric substrate 21 has a structure comprising two bent parts. However, the number of the bent parts may be other than two, or the transmission line 20b may be formed of a straight-line line having no bent part.

In this connection, in the case of this second embodiment, because lengths of the surface coplanar waveguides 20b, 32 become longer than those in the first embodiment, it is desirable to devise the surface coplanar waveguides 20b, 32 so that the lengths of them including the dielectric substrate 21 become as short as possible.

As is the case with the first embodiment, such a configuration makes it possible to realize a high-bit-rate optical module equipped with a high-frequency transmission line having an excellent high-frequency transmission characteristic at low cost.

As described above, the surface coplanar waveguides 3a, 23, 20b, 32 are defined as a waveguide that the ground layer does not exist in the lower layer and the upper layer of the signal line (conductor) 11, 231, 201, 321 excepting a surface which the substrate is mounted on the case 70, the base member 8, or the stem (not shown) etc.; or as a waveguide which the ground layer doses not affect the electric field distribution even if the ground layer exists in the waveguide.

Next, a third embodiment of an optical module handling a high bit rate according to the present invention will be described with reference to FIG. 8.

Figure 8:
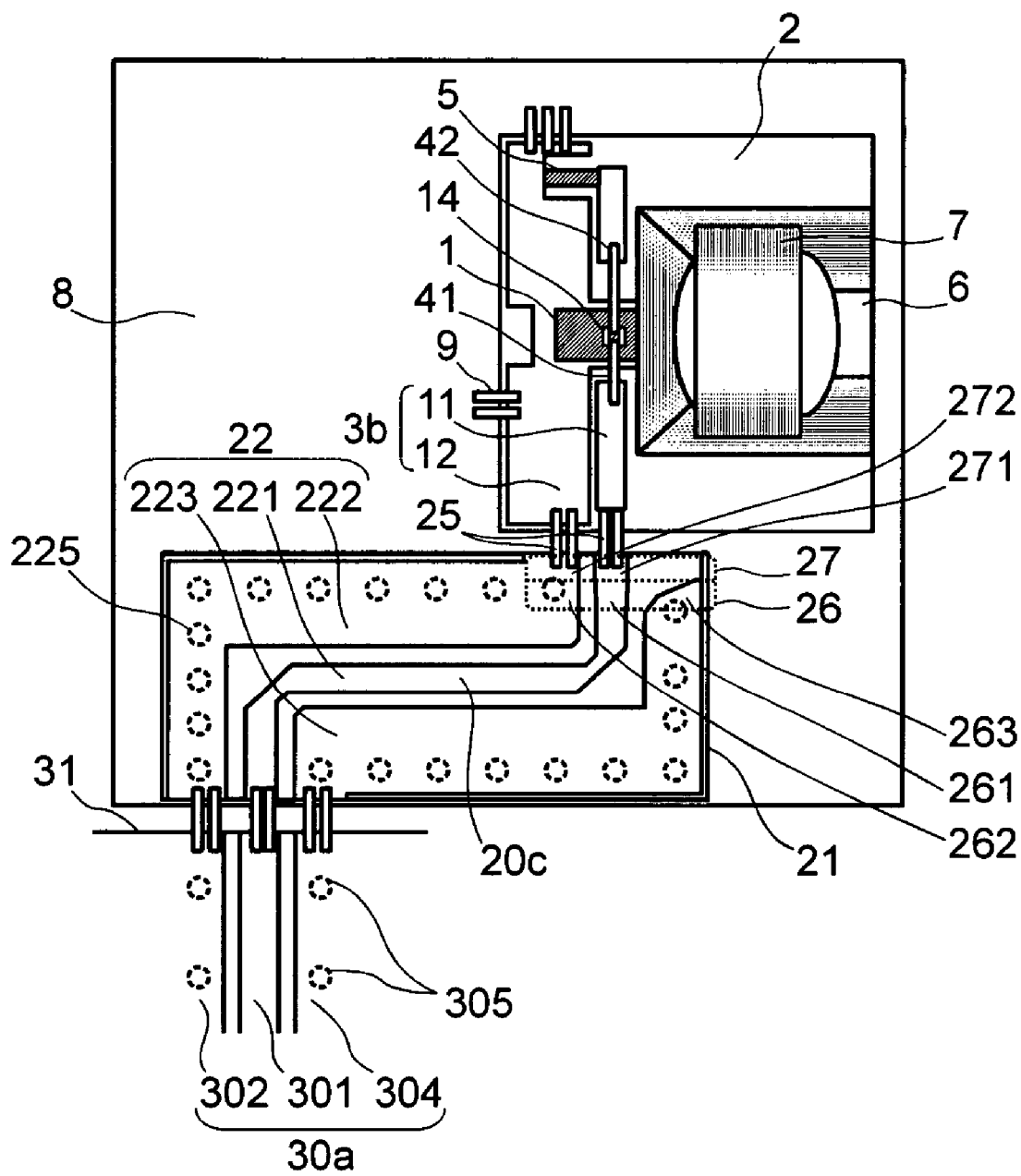
FIG. 8 is a schematic diagram illustrating a third embodiment of a high-frequency transmission line according to the present invention.

FIG. 8 also relates to a high-frequency transmission line according to the present invention, and is a diagram illustrating a transmission line on a carrier where an optical modulator is mounted, and areas around another transmission line for supplying a signal to the optical modulator. In this third embodiment, a transmission line (fourth high-frequency transmission line) 3b on the carrier 2 on which the optical modulator 1 is mounted is a coplanar strip waveguide. This coplanar strip waveguide 3b has a structure in which a signal line 11 and the ground wiring conductor 12 are placed only on one side of the signal line 11. It should be noted that each optical part is placed in a manner similar to FIGS. 3A and 3B.

Because the coplanar strip waveguide is used as the transmission line 3b on the carrier 2, the ground wiring conductor 12 on the surface of the carrier 2 is electrically connected through the conductor wire 9 made of Au, etc. to a metal part (member on the under surface of the carrier) in the base member 8 where the carrier 2 is mounted. The metal part in the base member 8 is electrically connected to the case 70 of the optical module package so that the potential becomes 0. Because there is the conductor wire 9, it is possible to shift a frequency at which resonance (caused by an electric field leaking into the carrier 2) occurs to a high-frequency band, and thereby an excellent transmission characteristic in a band to be used can be achieved. In this third embodiment, a plurality of conductor wires 9 are placed at two positions, that is to say, in the middle of, and at the edge of, the ground wiring conductor 12. It is desirable that a placement interval of the conductor wires be shorter than ¼ of the minimum wavelength of a signal transmitted through the transmission line 3b.

If a structure (coplanar waveguide) in which ground wiring conductors exist on both sides of a signal line on the carrier 2 is used to connect the ground wiring conductors to a metal surface of the base member, the number of conductor wires increases. In addition to it, if there is a condenser lens 7 in the structure as shown in FIG. 8, placement of the conductor wires substantially becomes impossible, and consequently a wideband high-frequency circuit cannot be obtained.

However, configuring the transmission line 3b on the carrier 2 as described above makes it possible to obtain a high-frequency transmission line with an excellent high frequency property.

Moreover, the transmission line (fifth high-frequency transmission line) 20c on the dielectric substrate 21, which inputs a signal to the transmission line 3b on the carrier, has a structure in which an input side transmission line 22 is a grounded coplanar waveguide, an output side transmission line 27 is a coplanar strip waveguide, and a transmission mode conversion line 26 is provided between them. The input side transmission line 22 and the output side transmission line 27 are so devised to have sizes that make both characteristic impedances identical to each other at about 50 Ω. A conversion line 26 has a structure whereby one ground wiring conductor 263 is gradually kept away from a signal wiring conductor 261 while keeping the characteristic impedance at about 50 Ω, and at the same time, a width of the signal wiring conductor 261 and a distance between the other ground wiring conductor 262 and the signal wiring conductor 261 are gradually changed into a size of the coplanar strip waveguide in the output side transmission line 27. Further, the dielectric substrate 21 has a multilayer structure so that two ground wiring conductors 222 (including 262, 272) and 223 (including 263) on the surface become equipotential. In the multilayer structure, a ground layer is provided over the whole substrate, and right and left ground wiring conductors are electrically connected by use of this ground layer and via holes 225.

Also in the third embodiment, the transmission line 20c on the dielectric substrate 21 has a structure comprising two bent parts. However, the number of the bent parts may be other than two, or the transmission line 20*c* may be formed of a straight-line line having no bent part.

Moreover, a connection between the transmission line 20*c* on the dielectric substrate 21 and the transmission line 30*a* on the package substrate 31 is made in a manner similar to the first embodiment.

As described above, according to the third embodiment, as is the case with the first and second embodiments, it is possible to realize a high-bit-rate optical module equipped with a high-frequency transmission line having an excellent high-frequency transmission characteristic at low cost.

According to the present invention, even if a semiconductor substrate is used where it is difficult to form a through hole in a carrier on which an optical element, etc. are mounted, it is possible to avoid a loss caused by an electric field leaking into the substrate as a transmission line, and consequently an optical module equipped with a high-frequency transmission line having an excellent high-frequency characteristic of about 10 Gbit/s or more can be realized at low cost, which is an effect of the present invention.

What is claimed is:

1. An optical module comprising:
a carrier on which an optical element is mounted, said carrier being formed of a semiconductor material where a first high-frequency transmission line for transmitting a high-frequency electric signal to the optical element is formed; and
a dielectric substrate where a second high-frequency transmission line for supplying a high-frequency electric signal to the first high-frequency transmission line of the carried is formed; wherein:
a electrical connection is made between the first high-frequency transmission line and the second high-frequency transmission line by use of a conductor wire;
said first high-frequency transmission line is formed of a coplanar waveguide; and
said second high-frequency transmission line is formed by coupling a first coplanar waveguide, which is formed on an input side by providing a ground layer under the transmission line across a dielectric, to a second coplanar waveguide formed on an output side with a distance between a signal wiring conductor of the transmission line and the ground layer made longer as compared with the first coplanar waveguide or formed on the output side without providing the ground layer.

2. An optical module according to claim 1, wherein:
the carrier and the dielectric substrate are placed on and secured to a base member.

3. An optical module comprising:
a carrier on which an optical element is mounted, said carrier being formed of a semiconductor material where a first high-frequency transmission line for transmitting a high-frequency electric signal to the optical element is formed; and
a dielectric substrate where a second high-frequency transmission line for supplying a high-frequency electric signal to the first high-frequency transmission line of the carrier is formed; wherein:
an electrical connection is made between the first high-frequency transmission line and the second high-frequency transmission line by use of a conductor wire and a third high-frequency transmission line;
said first high-frequency transmission line and said third high-frequency transmission line are formed of coplanar waveguides; and
said second high-frequency transmission line is formed by coupling a first coplanar waveguide, which is formed on an input side by providing a ground layer under the transmission line across a dielectric, to a second coplanar waveguide formed on an output side with a distance between a signal wiring conductor of the transmission line and the ground layer made longer as compared with the first coplanar waveguide or formed n the output side without providing the ground layer.

4. An optical module according to claim 3, wherein:
said dielectric substrate is formed as a package substrate, and said second high-frequency transmission line is formed on the package substrate.

5. An optical module according to claim 1, wherein:
in the first coplanar waveguide of the second high-frequency transmission line, an electrical connection is made between the ground layer under the transmission line and the ground wiring conductor of the transmission line by use of via hole.

6. An optical module according to claim 3, wherein:
in the first coplanar waveguide of the second high-frequency transmission line, an electrical connection is made between the ground layer under the transmission line and the ground wiring conductor of the transmission line by use of a via hole.

7. An optical module according to claim 1, wherein:
in the second high-frequency transmission line, a conversion line for smoothly changing a transmission mode is provided between the first coplanar waveguide and the second coplanar waveguide.

8. An optical module according to claim 3, wherein:
in the second high-frequency transmission line, a conversion line for smoothly changing a transmission mode is provided between the first coplanar waveguide and the second coplanar waveguide.

9. An optical module according to claim 1 or 3, wherein:
a main constituent of a semiconductor material of the carrier is one of Si, GaAs, and InP.

10. An optical module according to claim 1 or 3, wherein:
said optical element is an optical modulator element or a semiconductor laser integrated with an optical modulator.

11. An optical transmission apparatus comprising:
an optical module according to claim 1 or 3; and
a multiplexing IC that multiplexes an inputted parallel signal and then inputs the multiplexed signal into the optical element of the optical module.

12. An optical module comprising:
a carrier formed of a semiconductor material, on which an optical element is mounted and a first high-frequency transmission line transmitting a high-frequency electric signal to the optical element is formed, the first high-frequency transmission line is made up of a coplanar strip waveguide configured by a first signal line and a first ground wiring conductor extended along at one side of the first signal line; and
a dielectric substrate, on which a second high-frequency transmission line supplying a high-frequency electric signal to the first high-frequency transmission line of the carrier is formed, the second high-frequency transmission line is made up of a coplanar strip waveguide configured by a second signal line, a second ground wiring conductor extended along at one side of the second signal line, and a third ground wiring conductor extended along at another side of the second signal line, wherein:

an electrical connection between the first signal line and the second signal line and another electrical connection between the first ground wiring conductor and the second ground wiring conductor are made by use of conductor wires respectively at an output side of the second high-frequency transmission line, and the second high-frequency transmission line has a transmission mode conversion structure at the output side thereof, which is configured by increasing a distance between the second signal line and the third ground wiring conductor toward an end of the second signal line at output side thereof.

13. An optical module according to claim 12, wherein:

the dielectric substrate has a multilayer structure provided with a ground layer under the second high-frequency transmission line, the second ground wiring conductor and the third ground wiring conductor are electrically connected to the ground layer by via holes formed therein.

14. Optical module according to claim 13, wherein:

the distance between the second signal line and the third ground wiring conductor is changed gradually toward the end of the second signal line at the output side of the second high-frequency transmission line.

15. An optical module according to claim 14, wherein:

the width of the second signal line and another distance between the second ground wiring conductor and the second signal line are gradually changed at the output side of the second high-frequency transmission line toward the end of the second signal line thereat.

16. An optical module according to claim 15, wherein:

the second high-frequency transmission line is extended from an input side thereof to the output side thereof, and characteristic impedances of the second high-frequency transmission line at the input side thereof and at the output side thereof are identical to each other.

17. An optical module according to claim 12 further comprising a base member to which the carrier is secured, wherein:

the first ground wiring conductor is electrically connected to the base member.

* * * * *